2 Sheets. O. B. Ross. Grain Binder. Sheet I.
No. 118,975. Patented Sep. 12, 1871.
[47.]

Witnesses:
A. Bennerkendorf.
Wm. H. C. Smith.

Inventor:
O. B. Ross.

PER [signature]
Attorneys.

2 Sheets. Sheet: II.

[47.] O. B. Ross. Grain Binder.
No. 118,975. Patented Sep. 12, 1871.

Witnesses:
A. Benneckendorf.
Wm H. C. Smith.

Inventor:
O. B. Ross.

PER 
Attorneys.

UNITED STATES PATENT OFFICE.

OLIVER B. ROSS, OF BOWEN'S PRAIRIE, IOWA.

IMPROVEMENT IN GRAIN-BINDERS.

Specification forming part of Letters Patent No. 118,975, dated September 12, 1871.

*To all whom it may concern:*

Be it known that I, OLIVER B. ROSS, of Bowen's Prairie, in the county of Jones and State of Iowa, have invented a new and useful Improvement in Grain-Binder; and I do hereby declare that the following is a full, clear, and exact description thereof, which will enable others skilled in the art to make and use the same, reference being had to the accompanying drawing forming part of this specification, in which—

Figure 1:
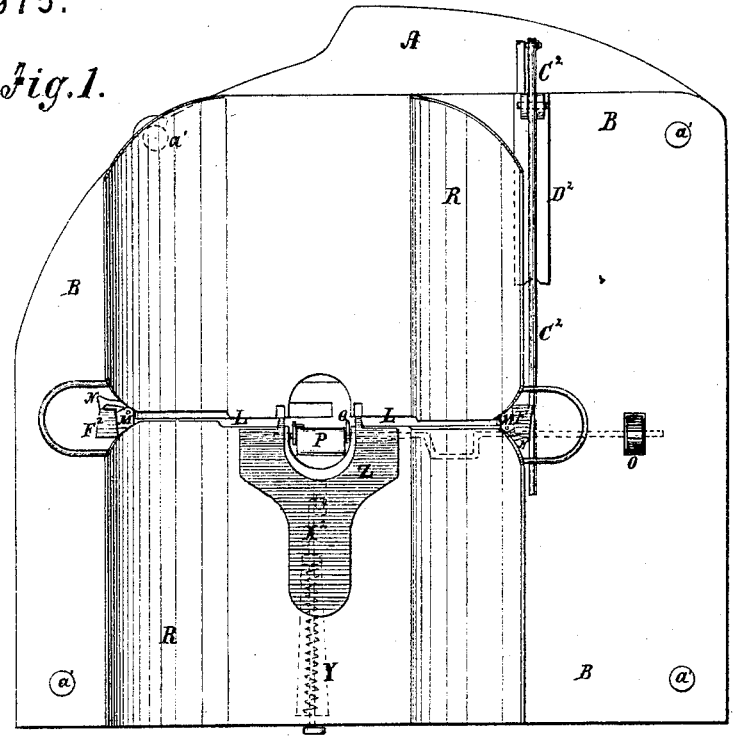
Figures 2, 3:
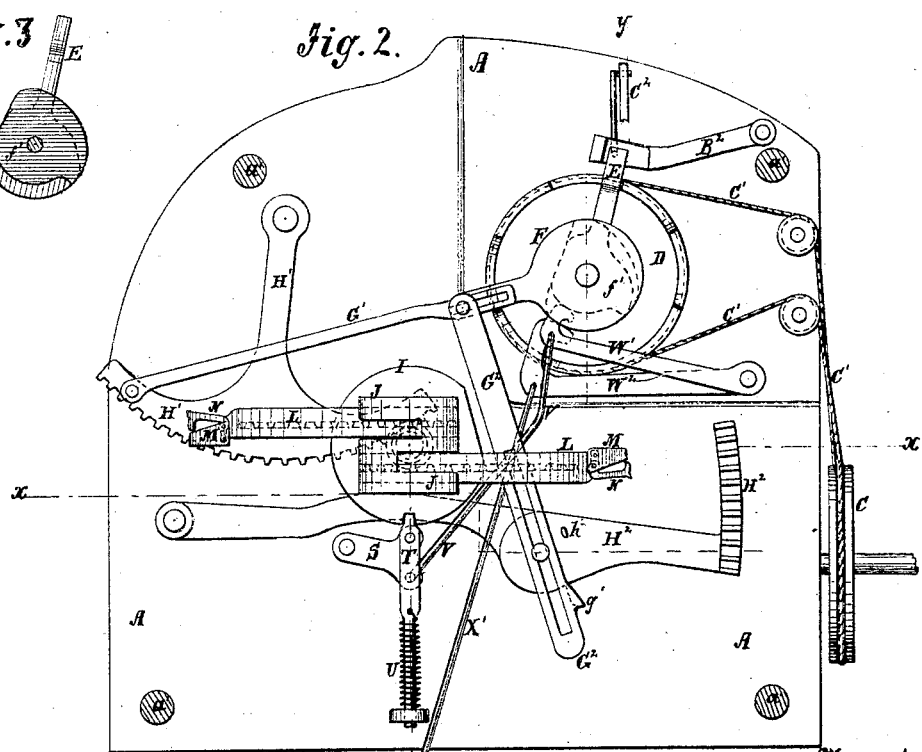
Figure 4:
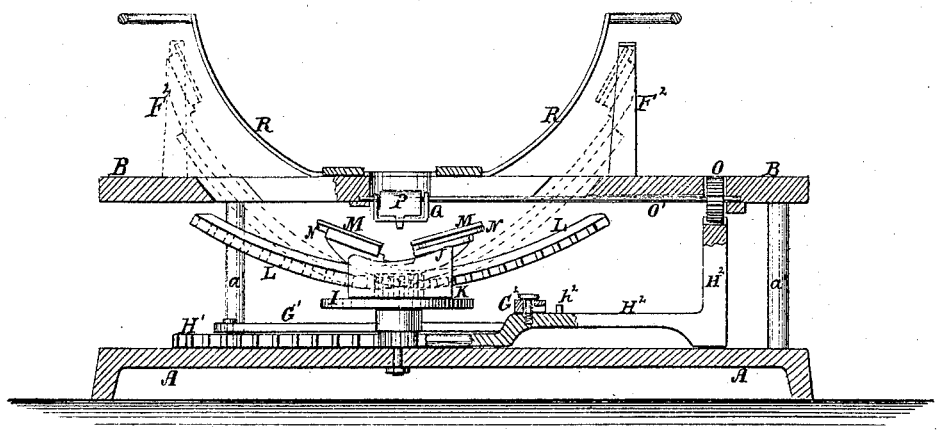
Figure 6:
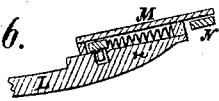
Figure 7:
Figure 8:
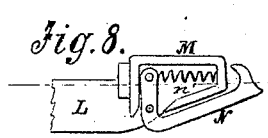
Figure 5:
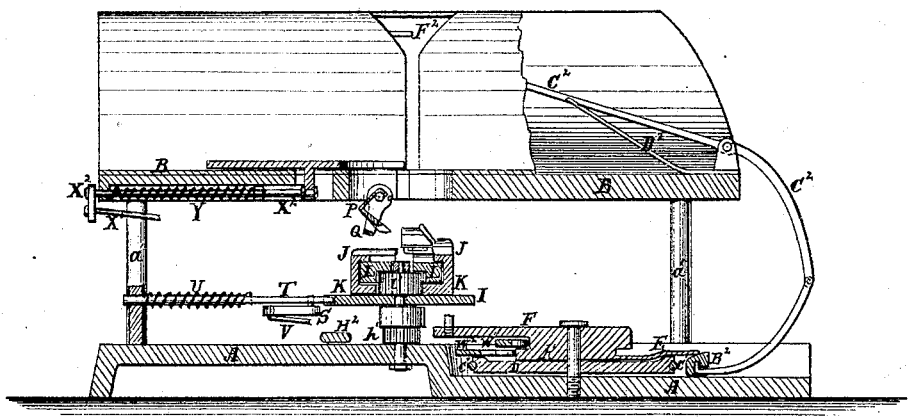
Figure 5:
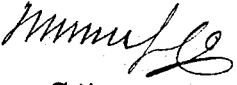

Figure 1, Sheet I, is a top view of my improved machine. Fig. 2, Sheet I, is a horizontal section of the same, showing the lower part of the frame and the mechanism attached thereto. Fig. 3, Sheet I, is a detail perspective view of the same. Fig. 4, Sheet II, is a detail vertical cross-section of the machine taken through the line $x\ x$, Fig. 2. Fig. 5, Sheet II, is a detail vertical longitudinal section of the same taken through the line $y\ y$, Fig. 2. Figs. 6, 7, and 8, Sheet II, are detail views of some of the operating parts of the mechanism.

Similar letters of reference indicate corresponding parts.

My invention has for its object to furnish an improved device for attachment to a reaper for binding the grain as it is cut, and which shall be simple in construction, convenient in use, and effective and reliable in operation; and it consists in the construction and combination of the various parts of the machine, as hereinafter more fully described.

A is the bottom and B is the top part of the frame, which are connected and held in their proper relative positions by posts $a'$. C is the belt-wheel, which is designed to be attached to the driving-shaft or wheel of the reaper. $c'$ is the belt or chain which passes around the wheel C and around the wheel D, which works loosely upon a gudgeon attached to the plate or frame A. E is a spring, connected with and carried around by the cam $f'$, which is formed upon or rigidly connected with the crank F, which works upon the same gudgeon with the wheel D. $G^1$ is a connecting-bar, through a slot in the forward end of which passes the crank-pin of the crank F, and the rear end of which is pivoted to the segment-arm $H^1$. To the crank-pin of the crank F is also pivoted the forward end of the connecting-bar $G^2$, through a long slot, in the rear part of which passes the pin that pivots it to the segment-arm $H^2$. I is a center-wheel, to which are attached the guides J for the arms L, which work upon the shoes K. To the ends of the arms L are attached the grabber-shoes M for the grabber-fingers N. The teeth of the segment-arm $H^1$ mesh into the teeth of a pinion-wheel, $h^1$, attached to shaft of the wheel I, and to the upper end of which shaft is attached a pinion-wheel, $l'$, the teeth of which mesh into the teeth of the arms L. The teeth of the segment-arm $H^2$ mesh into the teeth of the pinion-wheel O attached to the shaft $o'$ that carries the tucker P, and with which is connected a knife, Q, provided with a stop-pin, so that it will be moved forward by the tucker P at the proper time to cut the band from the grabber-fingers N. R is a semi-cylindrical plate or pan attached to the upper side of the top B of the frame to receive the grain to be bound. S is a plate pivoted to the bottom A of the frame, and to which is pivoted the latch T for holding the center-wheel I stationary at the proper time. The rear end of the latch T passes through a guide attached to the bottom A, and has a spring, U, coiled around or connected with it to hold the said latch forward to its work when not held back by action of the cam $f'$ of the crank F. V is a connecting-rod, the rear end of which is pivoted to the latch-holder S, and its forward end is pivoted to the lever $W^1$, which is pivoted to the bottom A in such a position that its forward end may be operated upon by the cam $f'$. Z is a band-holder, which is held forward by the spring Y, which is coiled around or connected with the rod $X^2$, the forward end of which is connected with the band-holder Z, and the rear end of which is connected by the rod $X^1$ with the lever $W^2$, which is pivoted to the bottom A in such a position that its forward end may be operated upon by the cam $f'$ to draw back the band-holder Z at the proper time.

The grain to be bound is placed in the pan R. The operator draws the band across the bundle and places it in the grab-fingers N, and at the same time presses down the lever $C^2$, which draws back the stop $B^2$ and allows the spring E to drop into one of the ratchet-teeth formed upon the wheel D, so that the wheel D may carry the crank F forward with it. The movement of the crank F moves the segment-arm $H^1$, which revolves the pinions $h^1\ l'$ and draws down the arms L, with which the ends of the band have been connected.

As the arms L move down the band-holder Z is moved forward, so that its points may cross the transverse slot in the top B and pan R to prevent the band from slipping. When the arms L have been drawn into the shoes K the latch T is thrown back by the cam $f'$, and the wheel I and arms L are turned once around and then stopped, while the connecting-rod $G^2$ moves the segment $H^2$ and operates the tucker P, the point of which strikes under the lock of the band and turns the said lock between the band and bundle, at which time the knife Q is moved forward and cuts the band from the grabbers. The band-holder Z is then drawn back and the bound bundle may be removed from the machine. When the crank F has moved forward the length of the slot in the connection-rod $G^1$ it pushes back the segment-arms $H^1$ $H^2$. When the connection-rod $G^2$ has moved far enough back, the dog $g'$ on said rod $G^2$ slips from the pin $h^2$ upon the arm $H^2$. The connection-rod $G^2$ then moves free while the crank F moves the arm $H^1$ back, which turns the pinions $h^1$ $l'$ and pushes the arms L up through the frame B. As the arms L move up the shoes M strike against the stops $F^2$, which, as the arms L move up a little further, opens the grab-fingers N to receive the ends of the band. The stop $B^2$ is held forward against the wheel D by the spring $D^2$ that operates upon the lever $C^2$. The top $B^2$ raises the spring E out of the teeth of the wheel D and stops the crank F. The grab-fingers N are kept closed, except when opened by the stops $F^2$, by coiled springs $n'$, placed inside of the shoes M, as shown in Figs. 6 and 8.

Having thus described my invention, I claim as new and desire to secure by Letters Patent—

1. The arrangement of the bottom plate or frame A, slotted top plate or frame B, and slotted pan or curved plate R with each other to adapt them to receive the operating mechanism, substantially as herein shown and described.

2. The combination of the loose ratchet and band-wheel D, spring E, crank F, slotted arm $G^1$, segment-arm $H^1$ center-wheel I, pinions $h^1$ $l'$, arms L, and grabbers M N $n'$, for grasping and twisting the band, substantially as herein shown and described.

3. The combination of the latch T, spring U, pivoted latch-holder S, connecting-rod V, pivoted lever W, and cam $f'$ with the crank F and center-wheel I, for the purpose of releasing and stopping the wheel I, substantially as herein shown and described.

4. The combination of the band and ratchet-wheel D, spring E, crank F, slotted connecting-arm $G^2$, segment-arm $H^2$, pinion O, shaft $o'$, and tucker P, for the purpose of tucking the lock of the band between the band and bundle, substantially as herein shown and described.

5. The combination of the knife Q with the tucker P, substantially as herein shown and described, and for the purpose set forth.

6. The combination of the band-holder Z, spring Y, connecting-rod $X^2$, connecting-rod $X^1$, pivoted lever $W^2$, and cam $f'$, with each other and with the crank F, substantially as herein shown and described, and for the purpose set forth.

7. The combination of the stops $F^2$ with the grabbers M N $n'$, for the purpose of opening the grabber-fingers N to receive the ends of the bands, substantially as herein shown and described.

8. The combination of the lever $C^2$, spring $D^2$, and stop $B^2$ with the spring E, crank F, and ratchet band-wheel D, for the purpose of throwing the crank F and wheel D into and out of gear with each other, substantially as herein shown described.

OLIVER B. ROSS.

Witnesses:
JAMES DAVIDSON,
JOSEPH S. MOODY.